United States Patent [19]
Kaesemeyer et al.

[11] 3,712,001
[45] Jan. 23, 1973

[54] COOLANT DISCHARGE SYSTEM FOR GRINDING MACHINE

[75] Inventors: Carl W. Kaesemeyer, Cincinnati, Ohio; Dean H. Garman, Cincinnati, Ohio

[73] Assignee: Cincinnati Milacron Inc., Cincinnati, Ohio

[22] Filed: Feb. 5, 1971

[21] Appl. No.: 112,949

[52] U.S. Cl. ...................................51/356, 51/267
[51] Int. Cl. ...........................................B24b 55/02
[58] Field of Search..51/356, 267, 215 AR, 215 HM, 51/216 T, 216 ND

[56] References Cited

UNITED STATES PATENTS

| | | | |
|---|---|---|---|
| 959,140 | 5/1910 | Hope | 51/266 UX |
| 3,417,517 | 12/1968 | Rose | 51/356 |
| 3,128,580 | 4/1964 | Davis | 51/267 X |
| 1,963,448 | 6/1934 | Robbins | 51/356 |
| 3,548,549 | 7/1968 | Dunn | 51/267 X |
| 2,788,622 | 4/1957 | Weber | 51/267 X |
| 2,228,386 | 1/1941 | Burns | 51/267 |
| 1,185,182 | 5/1916 | Davis | 51/267 |

Primary Examiner—Donald G. Kelly
Attorney—Howard T. Keiser and Jack J. Earl

[57] ABSTRACT

Coolant is directed into the machining zone during a grinding operation through a primary coolant discharge which substantially floods the entire machining zone with coolant, under pressure, and a secondary discharge which directs coolant specifically to critical heat points on the grinding wheel and workpiece. Coolant, under pressure, is contained in the machining zone by a container placed in front of both the grinding wheel and workpiece. The container substantially conforms to the configuration of the periphery of the workpiece, and channels coolant, under pressure, around the periphery of the workpiece keeping the machining zone and workpiece substantially flooded with coolant during grinding operations.

6 Claims, 8 Drawing Figures

PATENTED JAN 23 1973
3,712,001
SHEET 1 OF 3
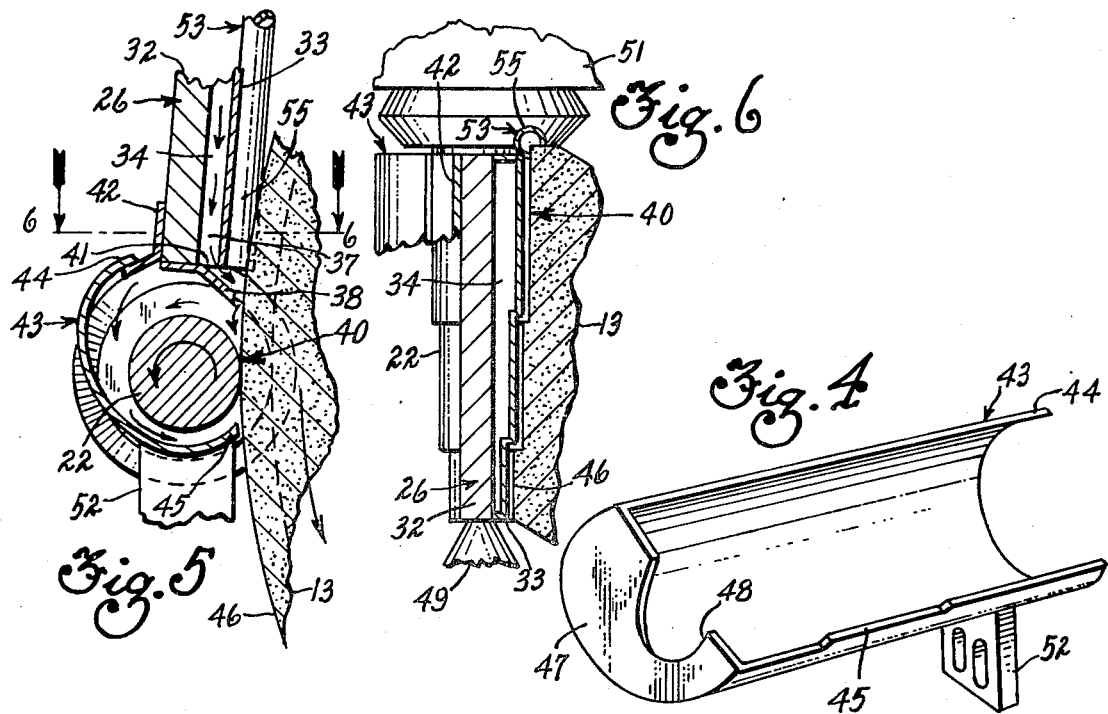
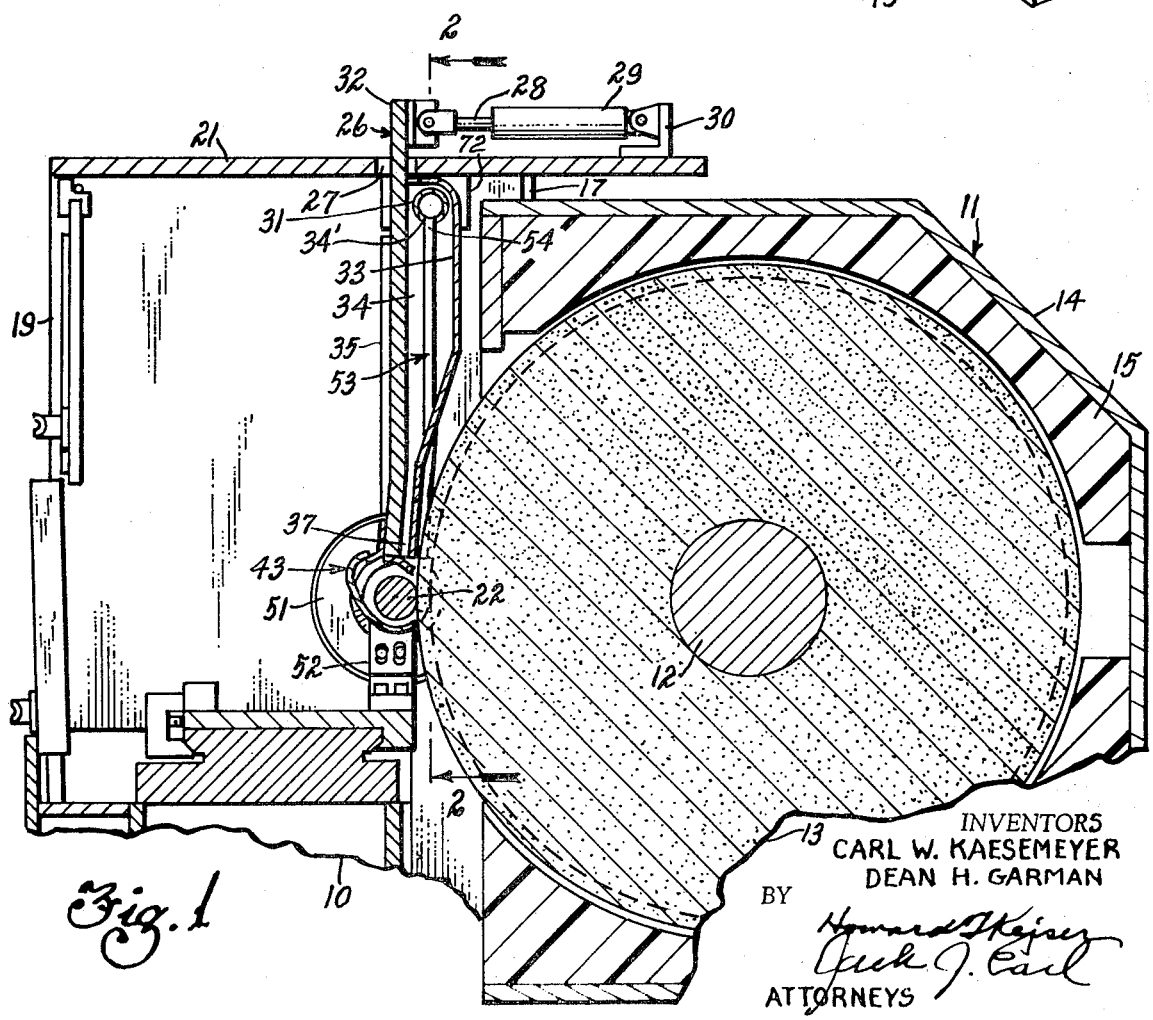
INVENTORS
CARL W. KAESEMEYER
DEAN H. GARMAN
BY
Howard Keizer
Jack J. Earl
ATTORNEYS

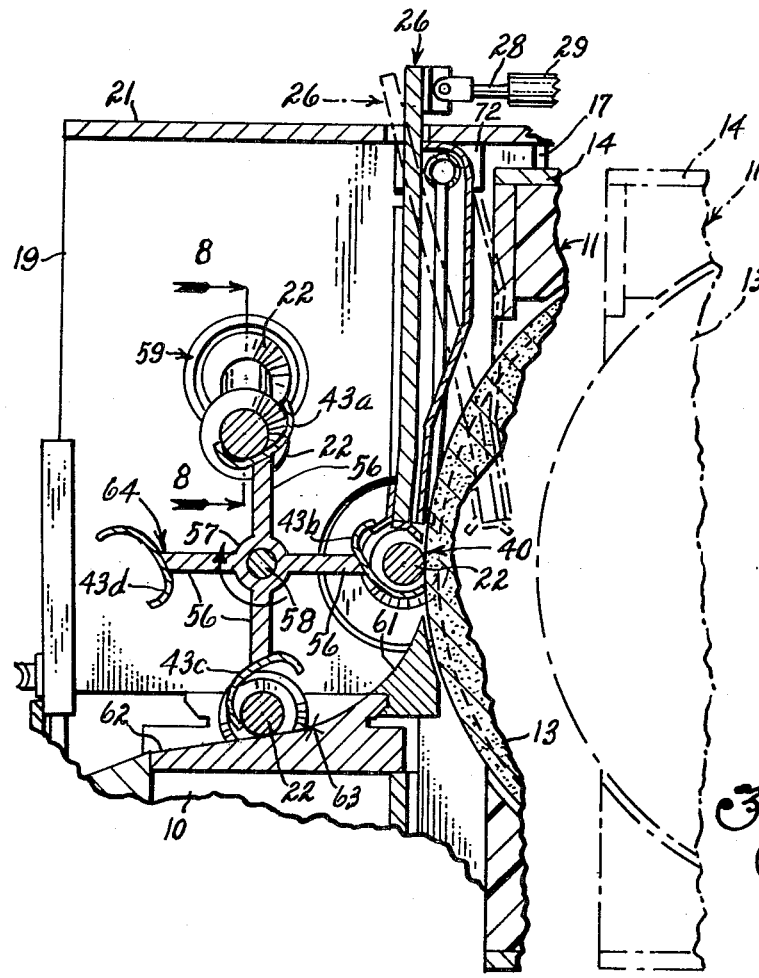
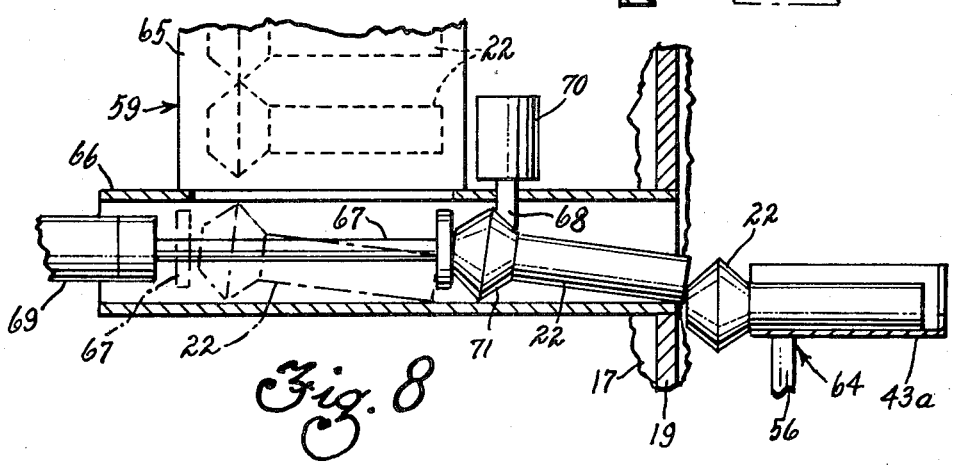

COOLANT DISCHARGE SYSTEM FOR GRINDING MACHINE

BACKGROUND OF THE INVENTION

The present invention relates to coolant and guard systems for grinding machines and more particularly to coolant systems utilized with high speed, high efficiency grinding.

In high speed grinding, the workpiece and the grinding wheel rotate relative to each other at a rate often exceeding 12,000 surface feet per minute. This creates an air flow around the workpiece and forms a high pressure area directly above the operating zone which is difficult to penetrate with coolant. The coolant which is directed toward the workpiece and more specifically toward the grinding zone is picked up by the air flow and directed away from the point of contact between the wheel and workpiece, instead of toward it. Due to lack of sufficient cooling a temperature in excess of the acceptable operating temperature results often damaging the workpiece and causing excessive wheel wear. A secondary result is violent splashing of coolant into the environment around the machine.

In the past, several attempts have been made to contain the coolant and direct it to the critical operating zone with varying degrees of effectiveness. One prior art attempt was to place an air deflector above the coolant nozzle and adjacent to the wheel thus reducing the air flow directly above the operating zone. While this is satisfactory for conventional grinding techniques, it is not satisfactory when utilized with high speed, high efficiency grinding. The air flow around the grinding wheel is too great and the coolant must be released at high pressure to break the residuary air flow. Another prior art attempt was to force the coolant into the porous grinding wheel at a point calculated to cause a release of the coolant through centrifugal force at the point of grind. This also has proved to be unsatisfactory. The coolant carries small metal chips with it and the wheel acts as a filter to remove the chips. This causes clogging of the pores of the grinding wheel creating a safety hazard, reducing coolant flow, causing workpieces to heat excessively, and increasing wheel wear.

The present invention satisfactorily contains the coolant and directs it toward the surface of the workpiece. It further satisfactorily provides a means for directing the coolant to a critical area of the workpiece. The invention further provides a means for loading and unloading workpieces without requiring the operator to manually place the workpiece between centers in a center-type grinding operation.

The present invention is particularly contemplated for use with the guard system of the type shown and described in the co-pending patent application of Howard W. Renner and John A. Moores for "Guard System for High-Speed Grinder," Ser. No. 68,114, filed Aug. 31, 1970 and assigned to the assignee of the present invention. In this cited application a hollow shield is placed above the workpiece and adjacent to the grinding wheel to protect the operator from any fragments of an exploding grinding wheel during a grinding operation. Coolant flows through this shield for cooling the workpiece and the grinding wheel. This coolant also serves as an energy absorber in the event that a fragment from an exploding grinding wheel strikes and pierces the hollow shield.

The coolant system of the present invention additionally provides a means for containing the coolant in the machining zone and directing the coolant, under pressure, toward the point of contact between the wheel and workpiece. The coolant system also provides a method for directing coolant onto critical heat areas where excess coolant is needed to maintain the workpiece and wheel at an acceptable operating temperature. The present invention further provides satisfactory means for automatically loading and unloading workpieces between centers in a center-type operation.

It is an object of the present invention to provide a means for directing coolant into the machining zone and eliminating violent splashing of coolant into the environment around the machine without adversely effecting the safe operation of the grinding machine.

Another object of the present invention is to direct coolant in varying amounts to the critical heat areas of the workpiece and grinding wheel.

It is further an object of this invention to provide a convenient means for loading and unloading workpieces.

Other features and objects of the present invention will be readily perceived from the following description, claims and drawings.

DESCRIPTION OF THE DRAWINGS

The attached drawings illustrate the preferred embodiments of the invention, in which:

FIG. 1 is a sectional view of a grinding machine wheelhead and table utilizing the preferred embodiment of the present invention.

FIG. 4 is a perspective view of the coolant container.

FIG. 5 is an enlarged fragmentary view of FIG. 1 showing the coolant flow during a machining operation.

FIG. 6 is a sectional view taken along lines 6—6 of FIG. 5.

FIG. 7 is a view similar to FIG. 1 showing means for automatically loading and unloading parts utilizing the present invention.

FIG. 8 is a sectional view along lines 8—8 of FIG. 7.

DESCRIPTION: STRUCTURAL MODE

Figure 2:
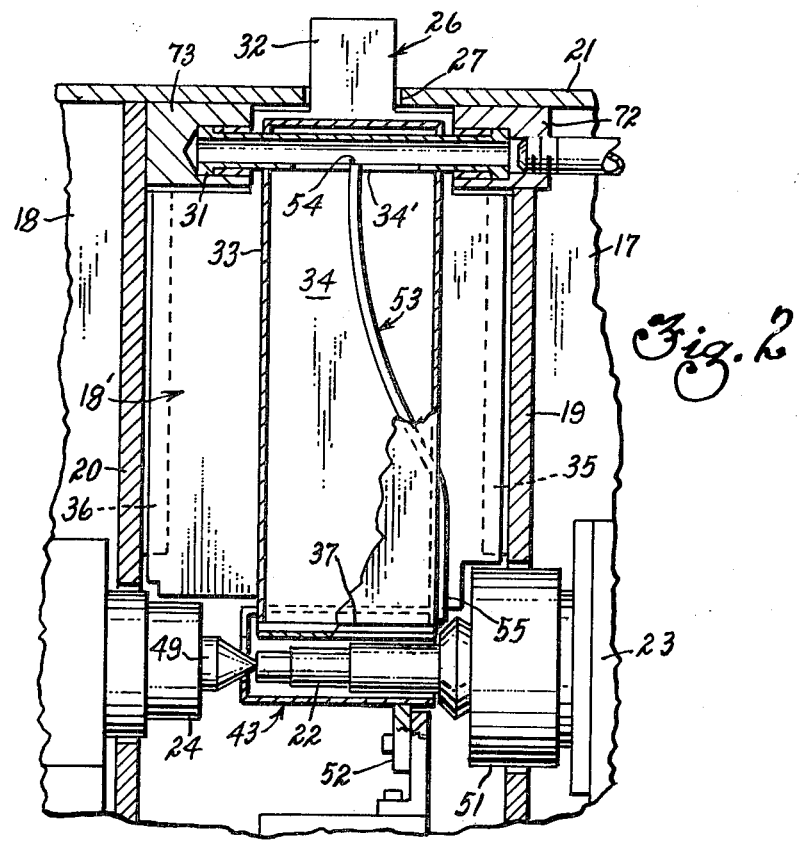
FIG. 2 is a view, partially in elevation and partially in section, showing the rear portion of the preferred embodiment.

Referring to the drawings in detail, and more particularly to FIG. 1 thereof, there is shown in section a portion of a grinding machine having a support base 10 on which is slidably supported a wheel head 11. A grinding spindle 12 is rotatably supported by the wheelhead 11 and has a grinding wheel 13 fixed to one end thereof. The other end of the spindle 12 is connected in the well-known manner to a drive motor (not shown) for rotating the grinding wheel 13.

The wheelhead 11 has a grinding wheel guard 14 supported thereon for cooperating with the grinding wheel 13 in the manner more particularly shown and described in the aforesaid Renner et al. application. The grinding wheel guard 14 has a deformable liner 15 made of a rigid closed cell composition to absorb some of the energy from fragments of the grinding wheel 13 in the event of the wheel bursting.

The base 10 has spaced rear walls 17 and 18 (see FIG. 2) extending upwardly therefrom to form a space 18 therebetween into which the grinding wheel 13 extends. The rear wall 17 has a side wall 19 secured thereto by suitable means such as welding, for example, and extending forwardly therefrom. Similarly, the rear wall 18 has a side wall 20, substantially parallel to the side wall 19, connected thereto and extending forwardly therefrom. The rear wall 17 and side wall 19, and the rear wall 18 and side wall 20 are secured to support base 10 in the manner more particularly described in the aforesaid Renner et al application.

Figure 3:
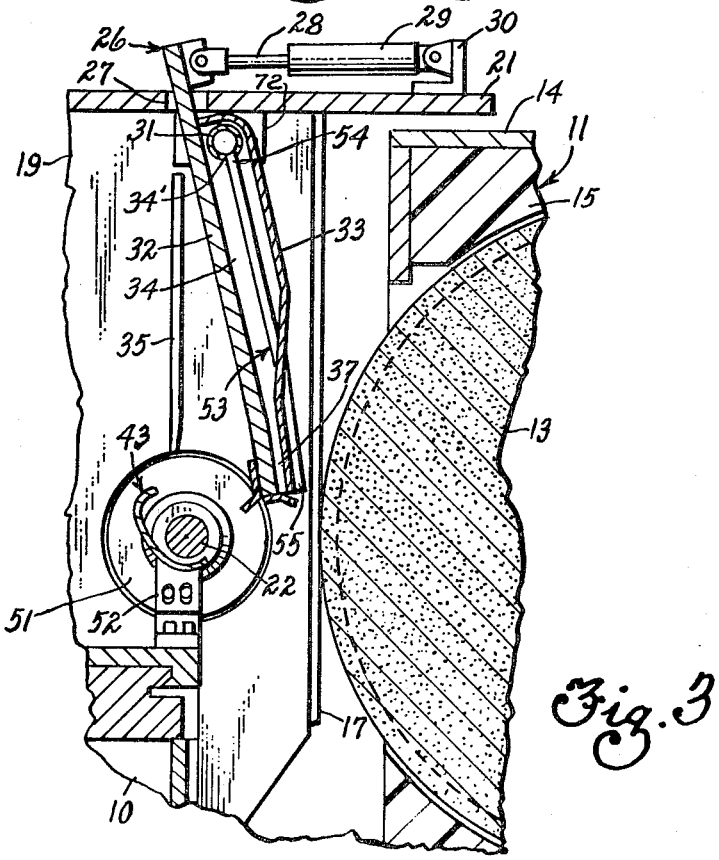
FIG. 3 is a view similar to FIG. 1 with the wheel-head and the hollow shield moved away from the machining zone for loading and unloading of workpieces.

A top plate 21 is secured to the tops of the side walls 19 and 20 and to the top of the rear wall 17 and 18 by a suitable means such as machine screws (not shown). As shown in FIGS. 1 and 3, the plate 21 extends over the top of guard 14.

The workpiece 22 is supported between a headstock 23 and a footstock 24 in the well-known manner. The workpiece 22 is rotatably driven by driving means 51 during grinding thereof.

A primary door or shield 26 has an upper end extending through a slot 27 and top plate 21 and is connected to a piston rod 28 of a hydraulic cylinder 29. This cylinder is pivotally mounted on a bracket 30, which is fixed to the top plate 21. A hollow pin 31 is welded to primary door 26 and ends of the hollow pin 31 pivot in blocks 72 and 73 which are secured to plate 21. The shield 26 is formed of a thick front plate 32 and sheet metal means 33, which is comprised of a plurality of members forming the top wall and side walls of the shield 26. The sheet metal means 33 cooperates with the plate 32 to form a chamber 34 therebetween. A coolant fluid is introduced into the chamber 34 through a longitudinal slot 34' in the lower portion of the hollow pin 31.

When the piston rod 28 has been retracted into the cylinder 29, the shield 26 is held in the position shown in FIG. 1 where the front plate 32 of the shield abuts against the rails or blocks 35 and 36, which are supported by the side walls 19 and 20, respectively. In this position, the coolant flows from the chamber 34 through a nozzle 37 at the lower end of the shield 26 onto the grinding wheel adjacent to the workpiece 22.

According, the shield 26 prevents, in the event of the wheel bursting, any fragments of the grinding wheel 13 from escaping between the workiece 22 and the top plate 21 since the lower end of the shield 26 is disposed adjacent the top of the workpiece 22. The coolant which is flowing through the chamber 34 and the shield 26, additionally serves as an energy absorber for fragments of the grinding wheel 13, should it explode and collapse sheet metal means 33.

The coolant is directed under pressure into the machining zone 40 through a suitable primary discharge means, for example, the nozzle 37 which consists of an aperture 41 and deflectors 38 and 42 are attached to plate 32 by a suitable means such as welding. The deflector 38 directs coolant into the wheel 13 at a point directly above the workpiece 22. The deflector 42 deflects coolant bouncing off the workpiece and the wheel back into the operating zone 40. Adjacent the deflector 42, and of substantially the same configuration as the periphery of the workpiece 22 is a container 43 which holds the coolant, under pressure, in the machining zone 40. As seen in FIG. 5, the coolant, therefore, substantially surrounds the workpiece 22; keeping the workpiece 22 in contact with the coolant for a longer period of time than conventional systems and minimizing the heat retained by the workpiece 22 and wheel 13 during a grinding operation.

The preferred embodiment of the container 43 is depicted in FIG. 4. It is basically a C-shaped deflector, the upper edge 44 abutting the deflector 42 and the lower edge 45 conforming generally to the shape of the wheel face 46 of the grinding wheel 13. The end wall 47 of the container 43 is substantially closed but has an opening 48 therein for entry of center 49 of the footstock 24 that holds the workpiece 22 during grinding. The opposite end of the container 43 is open for access to the driving means 51 of the headstock 23. The container 43 has secured to it a bracket 52 which is suited for fastening the container 43 to the base 10 of the grinding machine as shown, for example, in FIG. 1.

Placed in the hollow chamber 34 is a secondary discharge means, for example the hollow tube 53. The tube 53 has one end 54 open and placed in the longitudinal slot 34 of the hollow pin 31 in the manner shown in FIG. 2. The tube 53 is made of a rigid material such as steel, for example, and extends through the side portion of the sheet metal means 33 and extends to the bottom of the shield 26.

The container 43 can be utilized in an automatic loading sequence as the carrier for both unfinished and finished workpieces. An example of the container utilized in this manner is illustrated in FIGS. 7 and 8. Four containers 43a–d are rigidly connected together in ferris wheel fashion by the spokes 56 which are complimentary to each other. The hub 57 is secured to the rotatable pin 58 which rotates 90° each instance, being driven in the well-known manner. Above the upper most container 43a and adjacent to it is a transfer means 59 for transferring an unfinished workpiece 22 into the container 43a which in turn carries the workpiece 22 into the machining zone for grinding thereupon.

The container 43b is in the identical position as the container 43 in a manual loading-type operation. Thus it serves as a coolant container and carries workpiece 22 into, and out of, the machining zone.

Base 10 of the grinding machine is then cut away to follow the path of rotation 61 of the carrier 43c as it releases a finished workpiece 22. At the point 63 where the workpiece 22 is released from the container 43c the contour 62 continues downward to remove the finished workpiece 22 to a receptacle means (not shown).

DESCRIPTION: OPERATION MODE

Manual Loading

Before the initial grinding begins, the wheel 13, guard structure 14, and shield 26 are in the position shown in FIG. 3. The workpiece 22 is then placed in the container 43 manually by the operator. The footstock center 49 and the driving means 51—which includes a center (not shown) for locating the workpiece 22— then secure the workpiece 22 in the operating position. The driving means 51 then rotates the workpiece. The cylinder 29 is next actuated retracting the rod 28 and bringing shield 26 into the working position as shown in FIG. 1. Coolant then begins to flow through the hollow pin 31 and the longitudinal slot 34' into the chamber 34 and into the open end 54 of the tube 53. Coolant flows through the nozzle 37 and into the machining zone 40.

As shown in FIG. 6, the first workpiece 22, of a series of like workpieces, is secured in the machining zone. A portion of the sealed end 55 of the hollow tube 53 is ground away by the initial approach of the wheel, thus allowing coolant to escape through the opening and onto a critical heat point of the workpiece, for example the shoulder portion of the workpiece 22.

Also, on this initial approach the wheel 13 grinds away a portion of the deflector 38 of the nozzle and the edge 45 of the container 43. This process insures a close fit between the face of the wheel 46 and the edge 45 of the container 43, the deflector 38, and the end 55 of the tube 53. Thus, coolant is directed to and container in the critical regions of the workpiece 22 during a grinding operation.

On successive workpieces of the same size and configuration as the workpiece 22, the tube 53 and the edge 45 do not have to be further altered.

The coolant flows substantially as shown in FIG. 5, completely surrounding the workpiece 22 during grinding. The coolant also flows out of the end 55 of the tube 53 and into a critical heat point on the workpiece 22, such as the shoulder of the workpiece 22 as illustrated in FIG. 6.

The wheel 13 continues to feed into finish size. When the workpiece 22 is to size, the wheel 13 and guard system 14 then retract. After the wheel 13 is retracted the cylinder 29 is actuated, extending the rod 28, thus retracting the shield 26 to the position shown in FIG. 3.

The footstock 49 then releases the workpiece 22. The operator can remove the finished workpiece 22 and replace it with a new, unfinished workpiece. The cycle is then repeated.

automatic Loading

In an operation using automatic loading techniques the grinding wheel 13 again grinds away a portion of the tube end 55 and the deflector 38. However, the edge 45 of the container 43 is ground away on the first pass of each of the containers 43a-d, and a complete revolution of the loading device 64 is necessary before all containers 43a-d are sized to fit the contours of the wheel face 46.

Workpieces 22 are stored in a bin 65 in the manner well-known. Initially, one workpiece 22 drops into the transfer tube 66 as shown by the workpiece in phantom in FIG. 8. The push rod 67 then pushes the workpiece 22 into the stop 68. The push rod 67 then retracts into the cylinder 69 (as shown in phantom in FIG. 8) and a second workpiece 22 drops into the transfer tube 66. When the empty container 43a reaches the position shown in FIG. 7, the stop 68 retracts into the cylinder 70 and the push rod 67 pushes the workpiece 22 (in phantom) which in turn pushes the forward workpiece 22 into the container 43a. As soon as the head 71 of the forward workpiece 22 is past the stop 68, the stop 68 is extended to halt the progress of the rear workpiece 22 as it moves into position. At this point the loading mechanism 64 is as illustrated in FIG. 8 and the push rod 67 then retracts to the phantom position and the cycle is ready to repeat.

The loaded container 43a then rotates to the position of container 43b, the footstock center 49 and the center of the headstock 23 locate and secure the workpiece 22. Next, headstock drive 51 begins to rotate the workpiece 22. The piston 28 is then retracted into cylinder 29, closing the shield 26, and the grinding wheel 13 begins infeed. While grinding is being performed the new empty container 43d is loaded in the manner herein described. After grinding is complete the wheel 13 and the guard structure 14 retract. The piston 28 is then extended from the cylinder 29 removing the shield 26 from the machining zone 40. The headstock drive 51 then stops and the footstock center 49 releases the workpiece 22. The loading mechanism 64 then rotates 90° bringing a new workpiece 22 into the machining zone 40 and the grinding operation is ready to recycle.

As the loading mechanism 64 rotates the container 43b follows the path 61 to point 63 where the finished workpiece 22 rolls out of container 43b and as the mechanism 64 continues to rotate the finished workpiece 22 rolls down path 62 into a suitable receptacle (not shown).

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. In a grinding machine having a grinding wheel and a workpiece, a driving means for rotating said workpiece, and a securing means to locate the workpiece in the machining zone, an improved pressurized coolant system for cooling the workpiece and grinding wheel during grinding, comprising:
   a. primary means discharging coolant under pressure in the region adjacent the machining zone; and
   b. a container directing coolant around the periphery of the workpiece and containing the coolant in the machining zone, substantially flooding the machining zone in coolant under pressure.

2. The apparatus of claim 1 wherein said primary means comprises:
   a. an aperture through which coolant is discharged under pressure;
   b. a guide which directs coolant, under pressure, into the wheel adjacent to the point where the wheel contacts the workpiece; and
   c. a deflector which deflects coolant spray, bouncing off the wheel and the workpiece, back into the machining zone.

3. The apparatus of claim 2 wherein said container has an edge nearest said primary discharge means which overlaps the deflector of said primary discharge means.

4. The apparatus of claim 1 wherein said container comprises:
   a. a thin walled, rigid structure which substantially conforms to the shape of the periphery of the workpiece;

b. an edge on one side of the machining zone which fits adjacent the primary discharge means for reducing leakage between said primary discharge means and said container;

c. another edge on the other side of the machining zone which fits adjacent the wheel and conforms substantially to the configuration of the face of said wheel;

d. an open end which permits access of the workpiece driving and support means to said workpiece;

e. a closed end wherein there is an aperture for permitting access of the workpiece support means to said workpiece; and f. a support means which supports and secures the container to rigid structure of the grinding machine.

5. The apparatus of claim 4 wherein said container support means comprises:

a. an arm of rigid material which is fixedly secured to the container and extending therefrom; and b. a pin which is rotatably secured to rigid structure of the grinding machine and to which said arm is fixedly secured, whereby said container is moved into and out of the machining zone by rotating said pin.

6. The apparatus of claim 1 wherein there is introduced a secondary discharge means discharging coolant under pressure at critical heat areas of the workpiece comprising a hollow tube of rigid construction wherein:

a. coolant under pressure is introduced into one open end of said hollow tube; and b. the other open end of said tube is positioned adjacent a critical area of the workpiece for discharging coolant under pressure thereon.

* * * * *